United States Patent
Ferrari et al.

(10) Patent No.: US 10,907,998 B2
(45) Date of Patent: Feb. 2, 2021

(54) SYSTEM AND METHOD FOR ADJUSTING THE SAMPLING RATE OF A SENSOR MOUNTED ON AN AGRICULTURAL MACHINE

(71) Applicants: CNH Industrial Canada, Ltd., Saskatoon (CA); Autonomous Solutions, Inc., Mendon, UT (US)

(72) Inventors: Luca Ferrari, Modena (IT); John H. Posselius, Ephrata, PA (US); James W. Henry, Saskatoon (CA); Taylor C. Bybee, Logan, UT (US); Bret T. Turpin, Wellsville, UT (US); Jeffrey L. Ferrin, Smithfileld, UT (US)

(73) Assignees: CNH Industrial Canada, Ltd., Saskatoon (CA); Autonomous Solutions, Inc., Mendon, UT (US)

( * ) Notice: Subject to any disclaimer, the term of this patent is extended or adjusted under 35 U.S.C. 154(b) by 304 days.

(21) Appl. No.: 16/007,126

(22) Filed: Jun. 13, 2018

(65) Prior Publication Data

US 2019/0383650 A1    Dec. 19, 2019

(51) Int. Cl.
*G01D 9/00*    (2006.01)

(52) U.S. Cl.
CPC .................... *G01D 9/00* (2013.01)

(58) Field of Classification Search
CPC . G01D 9/00; G01D 18/00; G06T 7/13; G01C 21/3676; G01N 1/04; H04N 21/4223; H04N 5/23245; A01D 45/025; G01S 7/52028

See application file for complete search history.

(56) References Cited

U.S. PATENT DOCUMENTS

| | | | |
|---|---|---|---|
| 5,870,689 A | 2/1999 | Hale et al. | |
| 5,993,393 A * | 11/1999 | Ryan | G01S 7/52028 600/447 |
| 6,185,990 B1 | 2/2001 | Missotten et al. | |
| 6,963,881 B2 | 11/2005 | Pickett et al. | |
| 7,191,097 B1 | 3/2007 | Lee et al. | |
| 7,317,988 B2 | 1/2008 | Johnson | |

(Continued)

FOREIGN PATENT DOCUMENTS

ES    2371972 B1    11/2012

OTHER PUBLICATIONS

Coen T, Goethals I, Anthonis J, De Moor B, Baerdemaeker J D (2005) Modelling the propulsion system of a combine harvester, Internal Report 5-47, ESAT-SISTA, K.U. Leuven (Year: 2005).*

(Continued)

*Primary Examiner* — Regis J Betsch
*Assistant Examiner* — Kaleria Knox
(74) *Attorney, Agent, or Firm* — Rebecca L. Henkel; Rickard K. DeMille (57) ABSTRACT

In one aspect, a system for adjusting a sampling rate of a sensor mounted on an agricultural machine may include an agricultural machine and a sensor mounted on the agricultural machine, with the sensor being configured to capture data at a sampling rate. The system may also include a controller communicatively coupled to the sensor. The controller may be configured to receive an input indicative of an operational parameter of the agricultural machine and adjust the sampling rate at which the sensor captures data based on the received input.

15 Claims, 5 Drawing Sheets

(56) References Cited

U.S. PATENT DOCUMENTS

| | | | |
|---|---|---|---|
| 9,282,688 | B2 | 3/2016 | Casper et al. |
| 9,554,098 | B2 * | 1/2017 | Casper .................. A01B 63/28 |
| 10,584,971 | B1 * | 3/2020 | Askeland ............... G01C 21/30 |
| 2002/0022929 | A1 | 2/2002 | Ell |
| 2002/0169558 | A1 | 11/2002 | Smith et al. |
| 2007/0195182 | A1 * | 8/2007 | Ito ...................... H04N 5/23245 |
| | | | 348/308 |
| 2010/0066836 | A1 * | 3/2010 | Nakamura ......... H04N 21/4223 |
| | | | 348/159 |
| 2010/0071335 | A1 * | 3/2010 | Poeylaut .............. A01D 45/025 |
| | | | 56/94 |
| 2011/0240730 | A1 * | 10/2011 | Covely ................... G01N 1/04 |
| | | | 235/375 |
| 2012/0123817 | A1 | 5/2012 | Hohenberger et al. |
| 2016/0078375 | A1 | 3/2016 | Ethington et al. |
| 2017/0112043 | A1 * | 4/2017 | Nair .................... A01B 17/002 |
| 2017/0251600 | A1 * | 9/2017 | Anderson ............. G01D 18/00 |

OTHER PUBLICATIONS

Data Loggers, SensorsONE Data Loggers, SensorsONE Measurement Instrumentation Products https://www.sensorsone.com/data-loggers/.

CROPWATCH, Yield Monitoring and Mapping, Institute of Agriculture and Natural Resources, University of Nebraska-Lincoln. https://cropwatch.unl.edu/ssm/mapping.

* cited by examiner

SYSTEM AND METHOD FOR ADJUSTING THE SAMPLING RATE OF A SENSOR MOUNTED ON AN AGRICULTURAL MACHINE

FIELD

The present disclosure generally relates to agricultural machines and, more particularly, to systems and methods for adjusting the sampling rate of a sensor mounted on an agricultural machine.

BACKGROUND

Agricultural implements, such as cultivators, disc harrows, seeders, and/or the like, perform one or more agricultural operations while being towed across a field by a suitable work vehicle, such as in agricultural tractor. In this regard, agricultural implements typically include one or more sensors mounted thereon to detect or otherwise capture data associated with the performance of such agricultural operations. Conventionally, the sensors generally detect or capture data at a predetermined constant interval or frequency, such as a predetermined time interval (e.g., every second) or a predetermined distance interval (e.g., every foot), known as a sampling rate. Large quantities of data may be generated when the agricultural implement includes numerous sensors and/or the sensors have high sampling rates (i.e., sample data frequently). However, the processors and other computing devices currently installed on agricultural implements or their associated work vehicles have limited computing power and, thus, are able to only process limited amounts of sensor data.

Accordingly, an improved system and method for adjusting the sampling rate of a sensor mounted on an agricultural machine would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for adjusting a sampling rate of a sensor mounted on an agricultural machine. The system may include an agricultural machine and a sensor mounted on the agricultural machine, with the sensor being configured to capture data at a sampling rate. The system may also include a controller communicatively coupled to the sensor. The controller may be configured to receive an input indicative of an operational parameter of the agricultural machine and adjust the sampling rate at which the sensor captures data based on the received input.

In another aspect, the present subject matter is directed to a method for adjusting a sampling rate of a sensor mounted on an agricultural machine, with the sensor being configured to capture data at the sampling rate. The method may include receiving, with a computing device, the data captured by the sensor at the sampling rate. The method may also include receiving, with the computing device, an input indicative of an operational parameter of the agricultural machine. Additionally, the method may include adjusting, with the computing device, the sampling rate of the sensor based on the received input.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for adjusting the sampling rate of a sensor mounted on an agricultural machine. Specifically, in several embodiments, a controller of the disclosed system may be configured to adjust the sampling rate at which the sensor captures data based on an input received by the controller.

For example, in one embodiment, the received input may correspond to the speed at which the agricultural machine is moved across the field. In such embodiment, the controller may be configured to adjust the sampling rate of the sensor based on the implement speed to maintain a constant data density. In this regard, when the machine speed is reduced, the sampling rate of the sensor may correspondingly be reduced to prevent an unnecessary increase in the density of data (e.g., the amount of data per unit of area) collected from the field. Furthermore, it may be desired that more or less data be collected in certain parts of the field across which the agricultural machine is moved or when the agricultural machine is positioned proximate to certain topographical features within the field (e.g., hills, depressions, and/or the like). As such, in another embodiment, the controller may be configured to adjust the sampling rate of the sensor based on inputs associated with the location of the agricultural machine within the field and/or the proximity of the agricultural machine to such topographical features within the field. By adjusting the sampling rate of the sensor based on various received inputs, the controller is able to prevent the sensor from collecting excessive amounts of data, thereby reducing the computational load on the controller.

Figure 1:
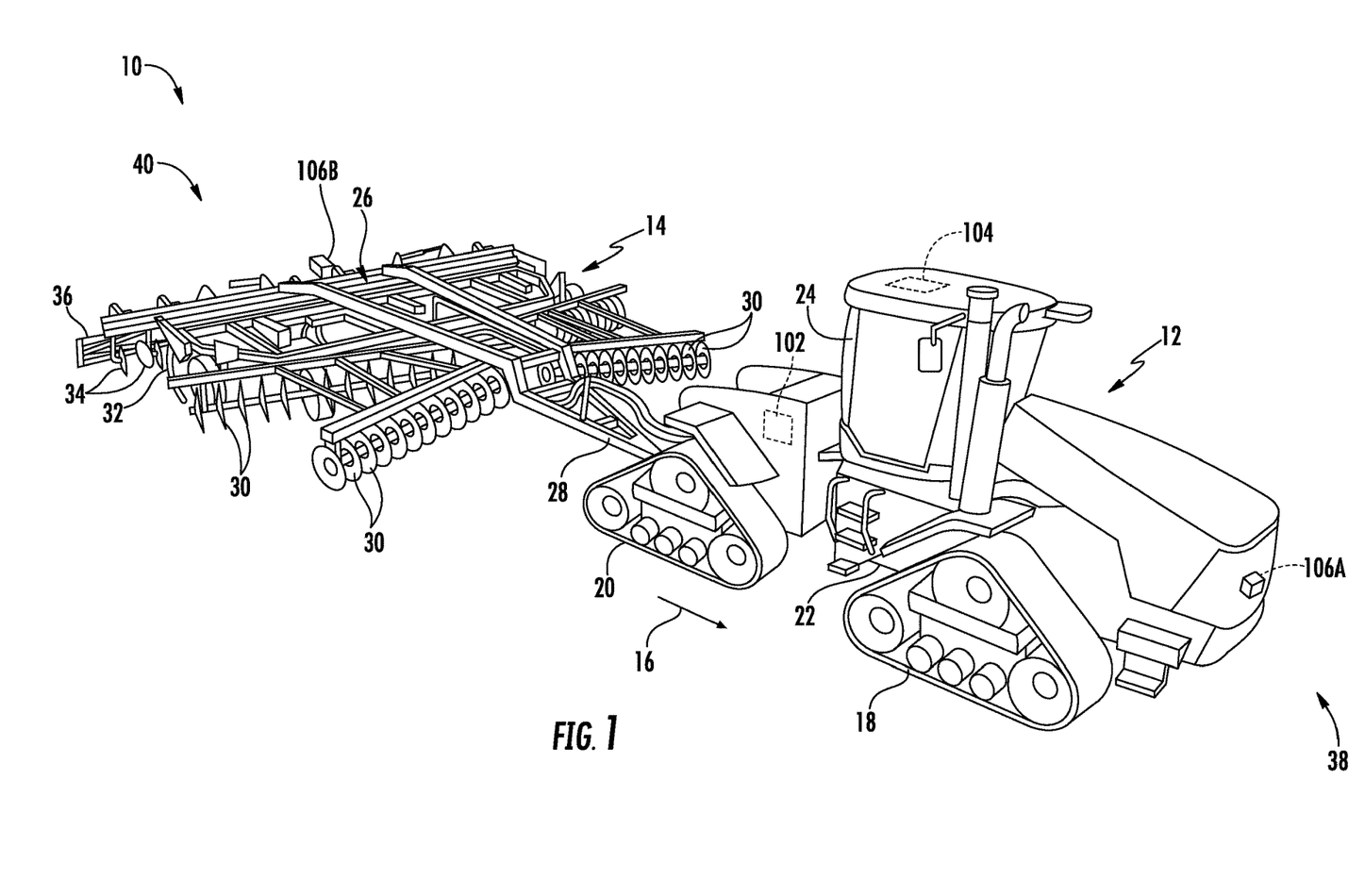
FIG. 1 illustrates a perspective view of one embodiment of an agricultural machine in accordance with aspects of the present subject matter, particularly illustrating the agricultural machine including a work vehicle and associated implement.

Referring now to drawings, FIG. 1 illustrates a perspective view of one embodiment of an agricultural machine 10 in accordance with aspects of the present subject matter. As shown, in the illustrated embodiment, the agricultural machine 10 includes as a work vehicle 12 and an associated agricultural implement 14. In general, the work vehicle 12 is configured to tow the implement 14 across a field in a direction of travel (e.g., as indicated by arrow 16 in FIG. 1). As shown, the work vehicle 12 may be configured as an agricultural tractor and the implement 14 may be configured as an associated tillage implement. However, in other embodiments, the work vehicle 12 may be configured as any other suitable type of vehicle, such as an agricultural harvester, a self-propelled sprayer, and/or the like. Similarly, the implement 14 may be configured as any other suitable type of implement, such as a planter. Furthermore, it should be appreciated that the agricultural machine 10 may correspond to any suitable powered and/or unpowered agricultural machine (including suitable vehicles and/or equipment, such as only a work vehicle or only an implement). Additionally, the agricultural machine 10 may include more than two machines (e.g., a tractor, a planter, and an associated air cart).

As shown in FIG. 1, the work vehicle 12 includes a pair of front track assemblies 18, a pair or rear track assemblies 20, and a frame or chassis 22 coupled to and supported by the track assemblies 18, 20. An operator's cab 24 may be supported by a portion of the chassis 22 and may house various input devices for permitting an operator to control the operation of one or more components of the work vehicle 12 and/or one or more components of the implement 14. Additionally, as is generally understood, the work vehicle 12 may include an engine (not shown) and a transmission (not shown) mounted on the chassis 22. The transmission may be operably coupled to the engine and may provide variably adjusted gear ratios for transferring engine power to the track assemblies 18, 20 via a drive axle assembly (not shown) (or via axles if multiple drive axles are employed).

Additionally, as shown in FIG. 1, the implement 14 may generally include a carriage frame assembly 26 configured to be towed by the work vehicle 12 via a pull hitch or tow bar 28 in the direction of travel 16 of the vehicle 12. As is generally understood, the carriage frame assembly 26 may be configured to support a plurality of ground-engaging tools, such as a plurality of shanks, disk blades, leveling blades, basket assemblies, tines, spikes, and/or the like. For example, in the illustrated embodiment, the carriage frame assembly 26 is configured to support various gangs of disc blades 30, a plurality of ground engaging shanks 32, a plurality of leveling blades 34, and a plurality of crumbler wheels or basket assemblies 36. However, in alternative embodiments, the carriage frame assembly 26 may be configured to support any other suitable ground engaging tools and/or combination of ground engaging tools. In several embodiments, the various ground-engaging tools may be configured to perform a tillage operation or any other suitable ground-engaging operation across the field along which the implement 14 is being towed. It should be understood that, in addition to being towed by the work vehicle 12, the implement 14 may also be a semi-mounted implement connected to the work vehicle 12 via a two point hitch (not shown) or the implement 14 may be a fully mounted implement (e.g., mounted the work vehicle's 12 three point hitch (not shown)).

Moreover, in one embodiment, the agricultural machine 10 may include a speed sensor 102 configured to detect a parameter associated with the speed at which the agricultural machine 10 is moved across the field. For example, in the illustrated embodiment, the speed sensor 102 may be provided in operative association with the work vehicle 12. In such embodiment, the speed sensor 102 may be configured to detect a parameter associated with the speed at which the work vehicle 12 is moved across the field. However, it should be appreciated that, in alternative embodiments, the speed sensor 102 may be provided in operative association with the implement 14 to detect a parameter associated with the speed at which the implement 14 is moved across the field. Furthermore, it should be appreciated that the speed sensor 102 may be configured as any suitable device for sensing or detecting the speed of the agricultural machine 10. For instance, in one embodiment, the speed sensor 102 may be configured as a Hall Effect sensor configured to detect the rotational speed of an output shaft of the transmission of the work vehicle 12.

Furthermore, as shown, the agricultural machine 10 may include a location sensor 104 configured to detect a parameter associated with a geographical or physical location of the agricultural machine 10 within the field. For example, in the illustrated embodiment, the location sensor 104 may be provided in operative association with the work vehicle 12. In such embodiment, the location sensor 104 may be configured to detect a parameter associated with the location of the work vehicle 12 within the field. However, it should be appreciated that, in alternative embodiments, the location sensor 104 may be provided in operative association with the implement 14 to detect a parameter associated with the location of the implement 14 within the field. Furthermore, it should be appreciated that the location sensor 104 may correspond to any suitable location sensing device for detecting the location of the agricultural machine 10. For instance, in one embodiment, the location sensor 104 may correspond to a GPS receiver configured to detect the GPS coordinates of the agricultural machine 10.

Additionally, in accordance with aspects of the present subject matter, the agricultural machine 10 may include one or more operational parameter sensors 106 coupled thereto and/or supported thereon. Specifically, in several embodiments, the operational parameter sensor(s) 106 may be configured to detect or capture data samples of one or more parameters associated with the operation being performed by the agricultural machine 10 and/or the operation of the agricultural machine 10 at a given sampling rate(s). In general, the sampling rate is the interval or frequency at which the operational parameter sensor(s) 106 detects or captures data samples. For example, the sampling rate may correspond to the number of samples taken during a unit of time, such as one data sample per second. In another embodiment, the sampling rate may correspond to the number of samples taken as the agricultural machine 10 travels a unit of distance across the field, such as one data sample per foot. In one embodiment, one or more of the operational parameter sensors 106 may be configured as vision-based sensors (e.g., cameras) configured to capture image data and and/or other vision-based data from the field (e.g., of the soil and/or plants present within the field) across which the agricultural machine 10 is moved. In such embodiment, each data sample may correspond to a captured image. In this regard, the sampling rate may correspond to the number of images captured during a unit of time or as the agricultural machine 10 travels a unit of distance.

As shown, in one embodiment, the operational parameter sensor(s) 106 may be provided in operative association with the work vehicle 12 and/or the implement 14. For instance, in the illustrated embodiment, one sensor 106A may be provided at a forward end 38 of the work vehicle 12 to allow the sensor 106A to capture sensor data of a section of the field disposed in front of the work vehicle 12. Similarly, as shown in FIG. 1, a second sensor 106B may be provided at or adjacent to an aft and 40 of the implement 14 to allow the sensor 106B to capture sensor data of a section of the field disposed behind the implement 14. In general, the first sensor 106A may be configured to detect or capture data at a first sampling rate, while the second sensor 106B may be configured to detect or capture data at a second sampling rate. In one embodiment, the first and second sampling rates may be different. However, it should be appreciated that, in alternative embodiments, the first and second sampling rates may also be the same. Furthermore, it should be appreciated that the sensors 106A, 106B may be installed at any other suitable location(s) on the work vehicle 12 and/or the implement 14. It should also be appreciated that the agricultural machine 10 may include only one operational parameter sensor 106 mounted on either the work vehicle 12 or the implement 14 or more than two operational parameter sensors 106 mounted on one or both of the work vehicle 12 or the implement 14.

Additionally, it should be further appreciated that the configurations of the agricultural machine 10 described above and shown in FIG. 1 is provided only to place the present subject matter in an exemplary field of use. Thus, it should be appreciated that the present subject matter may be readily adaptable to any manner of machine configuration.

Figure 2:
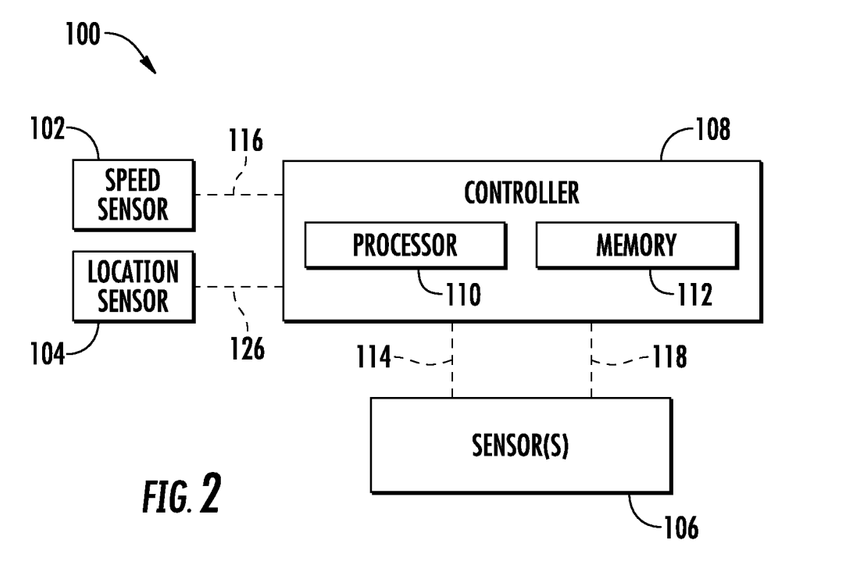
FIG. 2 illustrates a schematic view of one embodiment of a system for adjusting the sampling rate of a sensor mounted on an agricultural machine in accordance with aspects of the present subject matter.

Referring now to FIG. 2, a schematic view of one embodiment of a system 100 for adjusting the sampling rate of a sensor mounted on an agricultural machine is illustrated in accordance with aspects of the present subject matter. In general, the system 100 will be described herein with reference to the agricultural machine 10 described above with reference to FIG. 1. However, it should be appreciated by those of ordinary skill in the art that the disclosed system 100 may generally be utilized with agricultural machines having any other suitable machine configuration.

As shown in FIG. 2, the system 100 may include one or more components of the agricultural machine 10 described above with reference to FIG. 1. For example, in several embodiments, the system 100 may include one or more of the sensors associated with the agricultural machine 10, such as the speed sensor 102, the location sensor 104, and/or the operational parameter the sensor(s) 106. However, it should be appreciated that the system 100 may include any other suitable components of the agricultural machine 10, such as one or more other components of the work vehicle 12 and/or the implement 14.

Moreover, the system 100 may further include a controller 108 configured to electronically control the operation of one or more components of the agricultural machine 10, such as one or more components of the work vehicle 12 and or the implement 14. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 112 may generally be configured to store suitable computer-readable instructions that, when implemented by the processor(s) 110, configure the controller 108 to perform various computer-implemented functions, such as one or more aspects of the method 200 described below with reference to FIG. 7. In addition, the controller 108 may also include various other suitable components, such as a communications circuit or module, one or more input/output channels, a data/control bus and/or the like.

It should be appreciated that the controller 108 may correspond to an existing controller of the work vehicle 12 or the implement 14 or the controller 108 may correspond to a separate processing device. For instance, in one embodiment, the controller 108 may form all or part of a separate plug-in module that may be installed within the work vehicle 12 or implement 14 to allow for the disclosed system and method to be implemented without requiring additional software to be uploaded onto existing control devices of the work vehicle 12 or implement 14.

In several embodiments, the controller 108 may be configured to receive sensor data from the operational parameter sensor(s) 106. Specifically, the controller 108 may be communicatively coupled to the operational parameter sensor(s) 106, via a wired or wireless connection to allow sensor data (e.g., as indicated by dashed line 114 in FIG. 2) to be transmitted from the sensor(s) 106 to the controller 108. As indicated above, such sensor data 114 may be detected or captured by the operational parameter sensor(s) 106 at a given sampling rate(s). In this regard, the controller 108 may be configured to receive the sensor data 114 at the sampling rate(s) at which the operational parameter sensor(s) 106 detects or captures the sensor data 114. For example, in embodiments in which the operational parameter sensor(s) 106 correspond to a vision-based sensor(s), the controller 108 may be configured to receive captured images at sensor's associated the sampling rate.

Moreover, in several embodiments, the controller 108 may be configured to receive an input indicative of an operating parameter of the agricultural machine 10. For example, in several embodiments, such input may be indicative of the speed at which the agricultural machine 10 is moved across the field. Specifically, in one embodiment, the controller 108 may be communicatively coupled to the speed sensor 102, via wired or wireless connection to allow measurement signals (e.g., as indicated by dashed line 116 in FIG. 2) to be transmitted from the speed sensor 102 to the controller 108. As such, the controller 108 may be configured to determine or estimate the current speed at which the agricultural machine 10 is being moved across the field. For instance, the controller 108 may include a look-up table or suitable mathematical formula stored within its memory 112 that correlates the sensor measurements to the current speed of the agricultural machine 10.

Furthermore, in several embodiments, the controller 108 may be configured to adjust the sampling rate at which the operational parameter sensor(s) 106 detects or captures the sensor data 114 based on the determined speed of the agricultural machine 10. For example, in one embodiment, the controller 108 may be configured to adjust the sampling rate of the operational parameter sensor(s) 106 such that the density of the detected or captured sensor data 114 remains constant as the speed of the agricultural machine 10 varies as the agricultural machine 10 is moved across the field. As indicated above, the density of the sensor data 114 may, for example, refer to the number of data samples taken within the field per unit of area. In this regard, the controller 108 may be configured to transmit suitable control signals (e.g., as indicated by dashed line 118 FIG. 2) to the operational parameter sensor(s) 106 instructing the sensor(s) 106 to increase its sampling rate when the speed at which the agricultural machine 10 is being moved across the field increases. Conversely, the controller 108 may be configured to transmit suitable control signals 118 to the operational parameter sensor(s) 106 instructing the sensor(s) 106 to decrease its sampling rate when the speed at which the agricultural machine 10 is being moved across the field decreases.

Figure 3:
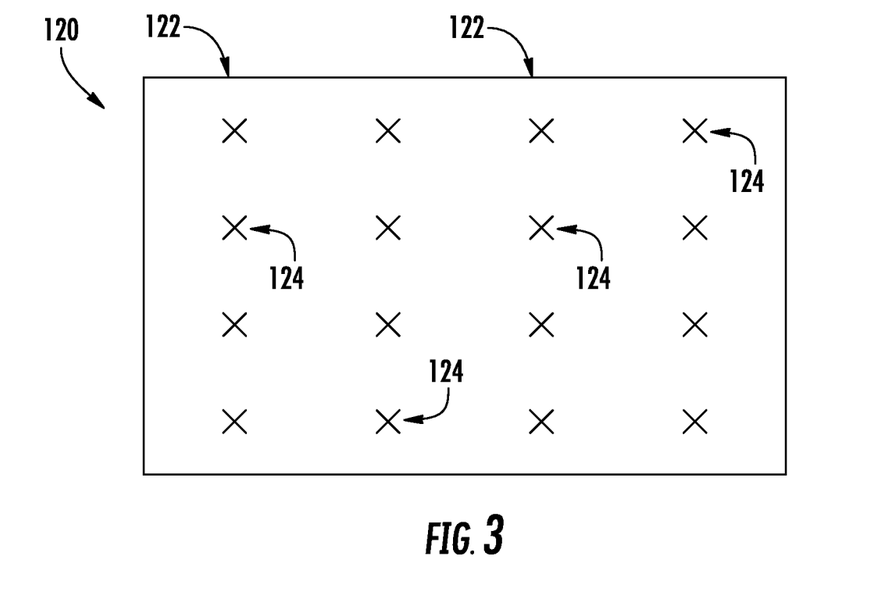
FIG. 3 illustrates an example data density map in accordance with aspects of the present subject matter, particularly illustrating the collected data having a constant data density.

Referring now to FIG. 3, an example data density map 120 is illustrated in accordance with aspects of the present subject matter. Such data density map 120 illustrates a uniform data density. Specifically, the data density map 120 includes several rows 122 of data samples 124. As shown, the various rows 122 of data samples 124 may be evenly spaced apart from each other. Furthermore, the various data samples 124 within each row 122 may similarly be spaced apart evenly from each other. As described above, by adjusting the sampling rate of the operational parameter sensor(s) 106 based on the speed of the agricultural machine 10, the controller 108 may be able to maintain a uniform data density, such as that shown in FIG. 3.

Referring back to FIG. 2, the controller 108 may also be configured to receive an input associated with the position of the agricultural machine 10 within the field. Specifically, the controller 108 may be communicatively coupled to the location sensor 104, via wired or wireless connection to allow location data (e.g., as indicated by dashed line 126 in FIG. 2) to be transmitted from the location sensor 104 to the controller 108. Based on the received location data 126, the controller 108 may be configured to determine the geographical position of the agricultural machine 10 within the field.

Furthermore, in several embodiments, the controller 108 may be configured to adjust the sampling rate at which the operational parameter sensor(s) 106 detects or captures the sensor data 114 based on the determined location of the agricultural machine 10 within the field. For example, in certain instances, it may be desirable to capture a greater density of sensor data 114 from a first portion of the field than from a second portion of the field. As such, the controller 108 may be configured to adjust the sampling rate of the operational parameter sensor(s) 106 such that the density of the detected or captured sensor data 114 in the first portion of the field is greater than the density of the detected or captured in the second portion of the field. In such embodiment, when the agricultural machine 10 is positioned within the first portion of the field, the controller 108 may be configured to transmit suitable control signals 118 to the operational parameter sensor(s) 106 instructing the sensor(s) 106 to detect or capture sensor data 114 at the greater sampling rate. Conversely, when the agricultural machine 10 is positioned within the second portion of the field, the controller 108 may be configured to transmit suitable control signals 118 to the operational parameter sensor(s) 106 instructing the sensor(s) 106 to detect or capture sensor data 114 at the lower sampling rate.

Figure 4:
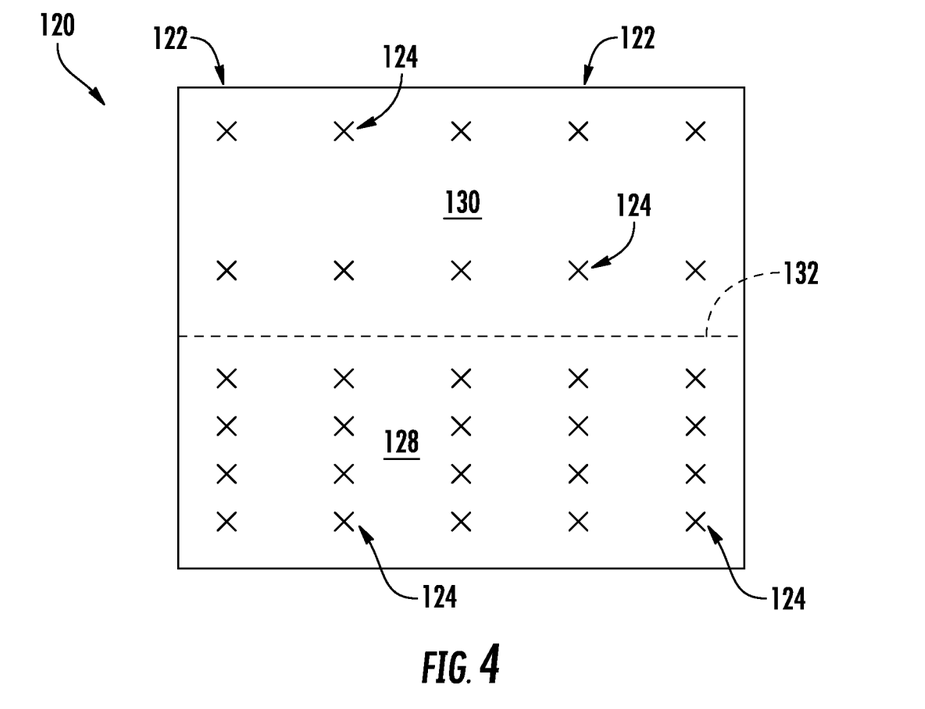
FIG. 4 illustrates another example data density map in accordance with aspects of the present subject matter, particularly illustrating a first data density within a first portion of the field and a second data density within a second portion of the field.

Referring now to FIG. 4, another example data density map 120 is illustrated in accordance with aspects of the present subject matter. Such data density map 120 illustrates a greater data density within a first portion 128 of the field than a second portion 130 of the field. Specifically, similar to the data density map 120 shown in FIG. 3, the data density map 120 of FIG. 4 includes several rows 122 of data samples 124. However, each row 122 of data samples 124 within the first portion 128 of the field includes more data samples 124 (e.g., twice as many data samples 124) as each row 122 of data samples 124 within the second portion 130 of the field. For the purposes of illustration, the first and second portions 128, 130 are separated by dashed line 132 in FIG. 4. As described above, by adjusting the sampling rate of the operational parameter sensor(s) 106 when the agricultural machine 10 leaves the first portion 128 of the field and enters the second portion 130 of the field, the controller 108 may be able to obtain a greater density of data within the first portion 128 of the field than the second portion 130 of the field.

Referring again to FIG. 2, the controller 108 may further be configured to receive an input associated with one or more topographical features (e.g., hills, ridges, depressions, and/or the like) within the field across which the agricultural machine 10 is being moved. Specifically, as indicated above, in one embodiment, the operational parameter sensor(s) 106 may be configured as a vision-based sensor(s). In such embodiment, the controller 108 may be configured to receive image data from such vision-based sensor(s). Thereafter, the controller 108 may be configured to identify any topographical features within the received image data. In this regard, the controller 108 may be configured to execute any suitable image processing algorithms stored within its memory 112 or otherwise use any suitable image processing techniques to identify the presence of topographical features within the received image data. In another embodiment, the controller 108 may include a topographical map of the field stored within its memory 112. In such embodiment, the controller 108 may be configured to compare the location of the agricultural machine 10 (e.g., as determined based on the location data 126 received from the location sensor 104) to the stored topographical map to identify any topographical features within the field proximate to the agricultural machine 10. However, it should be appreciated that, in alternative embodiments, the controller 108 may be configured to determine the proximity of the agricultural machine 10 to the topographical features within the field based on any other suitable input and/or data.

In several embodiments, the controller 108 may be configured to adjust the sampling rate at which the operational parameter sensor(s) 106 detects or captures the sensor data 114 based on the proximity of the agricultural machine 10 to topographical features within the field. For example, in certain instances, it may be desirable to capture a greater density of sensor data 114 when the agricultural machine 10 is positioned proximate to a first topographical feature (e.g., a depression or other low-lying area) within the field. Conversely it may be desirable to capture a lower density of sensor data 114 when the agricultural machine is positioned proximate to a second topographical feature (e.g., a hill, ridge, or other elevated area) within the field. As such, the controller 108 may be configured to adjust the sampling rate of the operational parameter sensor(s) 106 such that the density of the detected or captured sensor data 114 proximate to the first topographical feature is greater than the portions of the field in which no relevant topographical features are present. Moreover, the controller may be configured to adjust the sampling rate of the operational parameter sensor(s) 106 such that the density of the detected or captured sensor data 114 proximate to the second topographical feature is less than the portions of the field in which no relevant topographical features are present. In such embodiment, when the agricultural machine 10 is positioned proximate to the first topographical feature, the controller 108 may be configured to transmit suitable control signals 118 to the operational parameter sensor(s) 106 instructing the sensor(s) 106 to detect or capture sensor data 114 at the greater sampling rate. Conversely, when the agricultural machine 10 is positioned proximate to the second topographical feature, the controller 108 may be configured to transmit suitable control signals 118 to the operational parameter sensor(s) 106 instructing the sensor(s) 106 to detect or capture sensor data 114 at the lower sampling rate.

Figure 5:
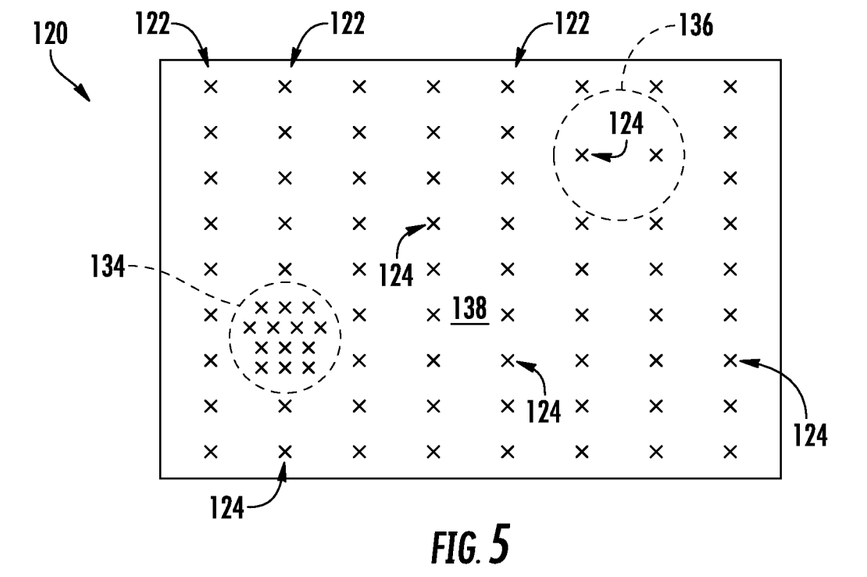
FIG. 5 illustrates a further example data density map in accordance with aspects of the present subject matter, particularly illustrating a lower data density relative to a first feature within the field and a higher data density relative to a second feature within the field.

Referring now to FIG. 5, a further example data density map 120 is illustrated in accordance with aspects of the present subject matter. Such data density map 120 illustrates a greater data density proximate to a first topographical feature 134 (e.g., as indicated by dashed circle 134 in FIG. 5) than the portions 138 of the field in which no relevant topographical features are present. Furthermore, the data density map 120 also illustrates a lower data density proximate to a second topographical feature (e.g., as indicated by dashed circle 136 in FIG. 5) than the portions 138 of the field in which no relevant topographical features are present. Specifically, as with the data density maps 120 shown in FIGS. 3 and 4, the data density map 120 of FIG. 5 includes several rows 122 of data samples 124. However, the data density map 120 includes a greater number of data samples 124 taken proximate to the first topographical feature 134 than the portions 138 of the field in which no relevant topographical features are present. Moreover, the data density map 120 includes a lower number of data samples 124 taken proximate to the second topographical feature 136 than the portions 138 of the field in which no relevant topographical features are present. As described above, by adjusting the sampling rate of the operational parameter sensor(s) 106, the controller 108 may be able to obtain a greater density of data proximate to the first topographical feature 134 and a lower density of data proximate to the second topographical feature 136.

Figure 6:
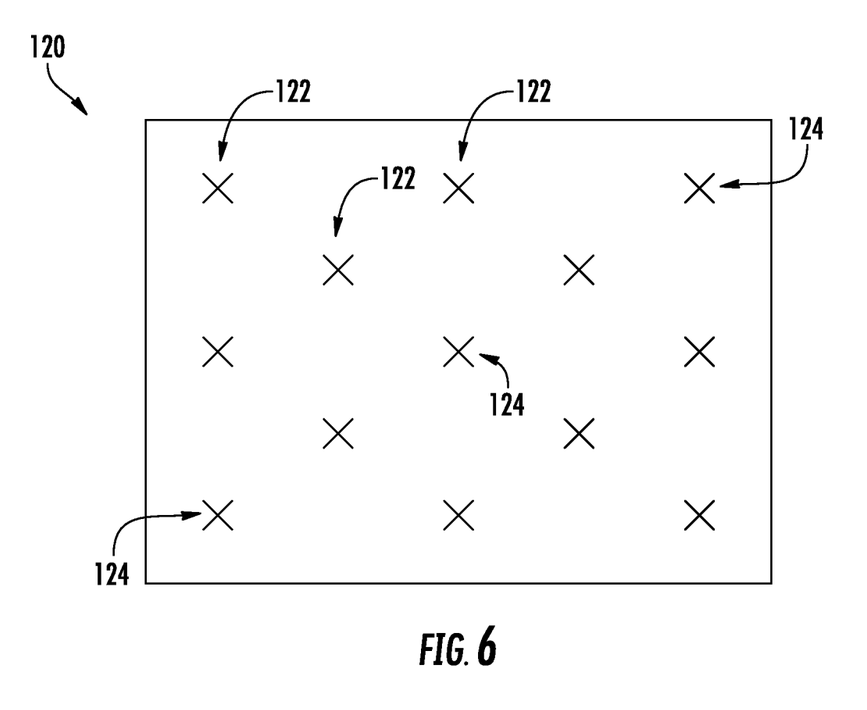
FIG. 6 illustrates yet another example data density map in accordance with aspects of the present subject matter, particularly illustrating the collected data having a hexagonal data distribution.

Additionally, in several embodiments, the controller 108 may be configured to adjust the sampling rate of the operational parameter sensor(s) 106 such that the sensor(s) 106 detects or captures sensor data 114 in a desired physical pattern. Specifically, in one embodiment, the controller 108 may be configured to control the sampling rate(s) of the operational parameter sensor(s) 106 based on one or more multi-dimensional Fourier-based sampling techniques such that two-dimensional hexagonal and/or rectangular sampling is performed. For example, as shown in FIG. 6, the desired physical pattern may correspond to a hexagonal sampling pattern. In general, each data sample 124 within a hexagonal sampling pattern is positioned within its corresponding row 122 such that it is positioned halfway between the data samples 124 within the adjacent rows 122. That is, the data samples 124 in a hexagonal sampling pattern may generally form a series of connected diamond shapes. In this regard, the controller 108 may be configured to transmit suitable control signals 118 to the operational parameter sensor(s) 106 instructing the sensor(s) 106 to sample the sensor data 114 in a manner that allows the desired physical pattern of sensor data 114 to be collected. It should be appreciated that, in alternative embodiments, the controller 108 may be configured to control the sampling rate(s) of the operational parameter sensor(s) 106 such that any other suitable physical pattern of sensor data 114 is collected. For example, as shown in FIG. 3, in another embodiment, a square pattern of sensor data 114 may be collected.

Referring again to FIG. 2, the controller 108 may be further configured to receive an input associated with the type or amount (e.g., percentage of residue coverage) of residue present within the field across which the agricultural machine 10 is moved. Specifically, as indicated above, the operational parameter sensor(s) 106 may be configured as a vision-based sensor(s). In such embodiment, the controller 108 may be configured to receive image data from such vision-based sensor(s). Thereafter, the controller 108 may be configured to identify any the type or amount of residue present within the field based on the received image data. In this regard, the controller 108 may be configured to execute any suitable image processing algorithms stored within its memory 112 or otherwise use any suitable image processing techniques to identify the type or amount of residue within the received image data. However, it should be appreciated that, in alternative embodiments, the controller 108 may be configured to determine the type or amount of residue present within the field based on any other suitable input and/or data.

In several embodiments, the controller 108 may be configured to adjust the sampling rate at which the operational parameter sensor(s) 106 detects or captures the sensor data 114 based on the type or amount of residue present within the field. For example, in certain instances, it may be desirable to capture a greater density of sensor data 114 when the amount of residue present within the field is low (e.g., the percent residue coverage is low). Conversely, it may be desirable to capture a lower density of sensor data 114 the amount of residue present within the field is high (e.g., the percent residue coverage is high). As such, the controller 108 may be configured to adjust the sampling rate of the operational parameter sensor(s) 106 such that the density of the detected or captured sensor data 114 is greater when the amount of residue present within the field is high. Moreover, the controller may be configured to adjust the sampling rate of the operational parameter sensor(s) 106 based on the type of residue present within the field. For example, the sensor data 114 may generally be more accurate when certain types of residue are present within the field than when other types of residue are present within the field. As such, when types of residue associated with high sensor accuracy are present within the field, the controller 108 may be configured to transmit suitable control signals 118 to the operational parameter sensor(s) 106 instructing the sensor(s) 106 to detect or capture sensor data 114 at the lower sampling rate. Conversely, when types of residue associated with low sensor accuracy are present within the field, the controller 108 may be configured to transmit suitable control signals 118 to the operational parameter sensor(s) 106 instructing the sensor(s) 106 to detect or capture sensor data 114 at the higher sampling rate. In this regard, the greater amount of sensor data 114 may at least partially compensate for the lower accuracy of such data 114.

It should be appreciated that the controller 108 may generally be able to process a maximum amount of sensor data 114 due to the limited computational power of the associated processor 110 and the limited storage capacity of the associated memory 112. In this regard, in several embodiments, the controller 108 may be configured to adjust the sampling rate of the operational parameter sensor(s) 106 such that the sensor(s) 106 is collecting the sensor data 114 at the maximum sampling rate at which the controller 108 is able to process such sensor data 114. Additionally, the controller 108 may be configured to adjust one or more operating parameters of the agricultural machine 10 such that the operational parameter sensor(s) 106 is collecting the sensor data 114 at the maximum sampling rate, while still maintaining the desired density of the sensor data 114. As indicated above, in one embodiment, a particular density of the sensor data 114 may be desired, such as when the agricultural machine 10 is positioned proximate to a particular topographical feature within the field. In certain instances, the agricultural machine 10 may be moving across the field at a speed that is too great to collect the desired density of sensor data 114 without exceeding the computational limitations of the controller 108. As such, the controller 108 may be configured to control one or more components of the agricultural machine 10 (e.g., the engine and/or transmission of the work vehicle 12) to adjust the speed of the agricultural machine 10 such that the desired density of sensor data 114 is detected or captured without exceeding the computational limitations of the controller 108.

Figure 7:
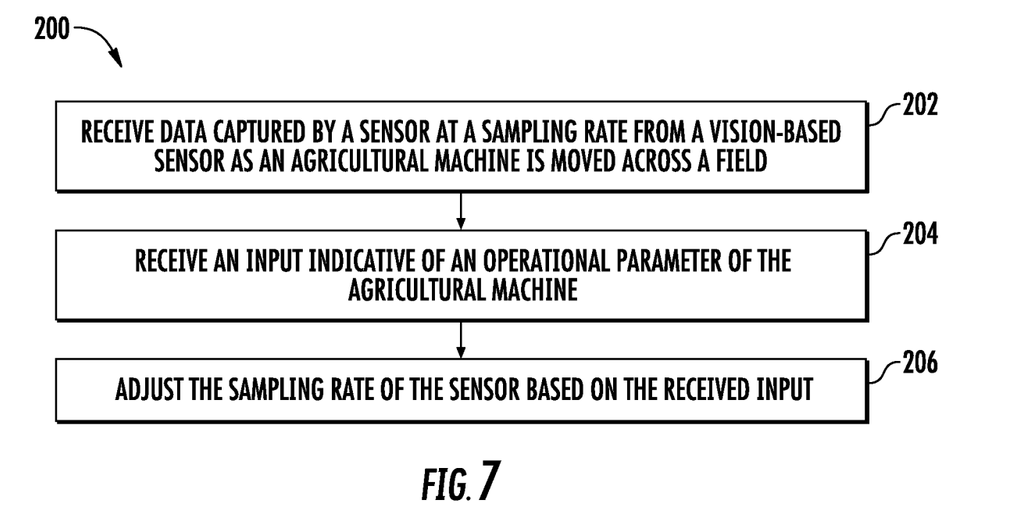
FIG. 7 illustrates a flow diagram of one embodiment of a method for adjusting the sampling rate of a sensor mounted on an agricultural machine in accordance with aspects of the present subject matter.

Referring now to FIG. 7, a flow diagram of one embodiment of a method 200 for adjusting the sampling rate of a sensor mounted on an agricultural machine is illustrated in accordance with aspects of the present subject matter. In general, the method 200 will be described herein with reference to the agricultural machine 10 and the system 100 described above with reference to FIGS. 1-6. However, it should be appreciated by those of ordinary skill in the art that the disclosed method 200 may generally be utilized to adjust the sampling rate of any sensor mounted on any agricultural machine having any suitable machine configuration and/or in connection with any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving, with a computing device, data captured by a sensor at a sampling rate. For instance, as described above, the controller 108 may be communicatively coupled to one or more operational parameter sensor(s) 106. As such, sensor data 118 captured by the operational parameter sensor(s) 106 at a corresponding sampling rate(s) may be received by the controller 108.

Additionally, at (204), the method 200 may include receiving, with the computing device, an input indicative of an operational parameter of the agricultural machine. For instance, as described above, in one embodiment, the controller 108 may be communicatively coupled to a speed sensor 102. As such, measurement signals 116 indicative of the speed at which the agricultural machine 10 is being moved across the field may be received by the controller 108. In another, the controller 108 may be communicatively coupled to a location sensor 104. In this regard, location data 126 from the location sensor 104 may be received by the controller 108, thereby allowing the controller 108 to determine the location of the agricultural machine 10 within the field. In a further embodiment, the controller 108 may be configured to receive image data from the operational parameter sensor(s) 106, with such image data being indicative of one or more topographical features within the field.

Moreover, as shown in FIG. 7, at (206), the method 200 may include adjusting, with the computing device, the sampling rate of the sensor based on the received input. For instance, as described above, based on the above input(s), and the controller 108 may be configured to transmit suitable control signals 118 instructing the operational parameter sensor(s) 106 to adjust the sampling rate at which such sensor(s) 106 detects or captures the sensor data 114.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for adjusting a sampling rate of a sensor mounted on an agricultural machine, the system comprising:
    an agricultural machine;
    a sensor mounted on the agricultural machine, the sensor being configured to capture data at a sampling rate;
    a controller communicatively coupled to the sensor, the controller being configured to receive an input, wherein the input is associated with at least one of a type or amount of residue present within a field across which the agricultural machine is moved, the controller being further configured to adjust the sampling rate at which the sensor captures data based on the received input.

2. The system of claim 1, wherein the input is associated with a location of the agricultural machine within a field.

3. The system of claim 2, wherein, as the agricultural machine is moved across a field, the controller is further configured to adjust the sampling rate when the agricultural machine transitions between first and second portions of the field.

4. The system of claim 1, wherein the controller is configured to adjust the sampling rate such that the sensor captures the data in a desired physical pattern.

5. The system of claim 1, wherein the sensor comprises a vision-based sensor.

6. A method for adjusting a sampling rate of a sensor mounted on an agricultural machine, the sensor being configured to capture data at the sampling rate, the method comprising:
receiving, with a computing device, the data captured by the sensor at the sampling rate;
receiving, with the computing device, an input, wherein the input is associated with at least one of a type or amount of residue present within a field across which the agricultural machine is moved; and
adjusting, with the computing device, the sampling rate of the sensor based on the received input.

7. The method of claim 6, wherein the input is associated with a location of the agricultural machine within a field.

8. The method of claim 7, further comprising:
as the agricultural machine is moved across a field, adjusting, with the computing device, the sampling rate when the agricultural machine transitions between first and second portions of the field.

9. The method of claim 6, further comprising:
adjusting, with the computing device, the sampling rate such that the sensor captures the data in a desired physical pattern.

10. The method of claim 6, wherein the sensor comprises a vision-based sensor.

11. A system for adjusting a sampling rate of a sensor mounted on an agricultural machine, the system comprising:
an agricultural machine;
a sensor mounted on the agricultural machine, the sensor being configured to capture data at a sampling rate;
a controller communicatively coupled to the sensor, the controller being configured to receive an input indicative of an operational parameter, the controller being further configured to adjust the sampling rate at which the sensor captures data based on the received input to maintain a constant amount of data per unit of area captured by the sensor within a first portion of a field.

12. The system of claim 11, wherein, as the agricultural machine is moved across a field, the controller is further configured to adjust the sampling rate when the agricultural machine transitions between the first portion and a second portion of the field.

13. The system of claim 12, wherein the first portion comprises a first topographical feature and the second portion comprises a second topographical feature.

14. The system of claim 13, wherein the controller is further configured to at least one of increase the sampling rate when the agricultural machine is positioned relative to a first topographical feature within the field or decrease the sampling rate when the agricultural machine is positioned relative to a second topographical feature within the field.

15. The system of claim 11, wherein the controller is configured to adjust one or more operating parameters of the agricultural machine such that the sensor collects the maximum amount of captured data that the controller is able to process, while still maintaining the constant amount of data per unit area.

* * * * *